US012711359B2

(12) United States Patent
Tang et al.

(10) Patent No.: US 12,711,359 B2
(45) Date of Patent: Aug. 18, 2026

(54) METHOD AND DEVICE FOR PROCESSING DATA BASED ON MULTI-LAYER PERCEPTRONS

(71) Applicant: Huawei Technologies Co., Ltd., Shenzhen (CN)

(72) Inventors: Yehui Tang, Beijing (CN); Kai Han, Beijing (CN); Jianyuan Guo, Beijing (CN); Yunhe Wang, Beijing (CN); Yanxi Li, Shenzhen (CN); Chang Xu, Shenzhen (CN); Chao Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 984 days.

(21) Appl. No.: 17/733,758

(22) Filed: Apr. 29, 2022

(65) Prior Publication Data

US 2023/0351163 A1 Nov. 2, 2023

(51) Int. Cl.
*G06F 18/213* (2023.01)
*G06F 18/21* (2023.01)
*G06N 3/048* (2023.01)

(52) U.S. Cl.
CPC .......... *G06N 3/048* (2023.01); *G06F 18/213* (2023.01); *G06F 18/2163* (2023.01)

(58) Field of Classification Search
CPC .......... G06N 3/048; G06N 3/045; G06N 3/08; G06F 18/213; G06F 18/2163; G06F 17/16; G06F 40/20; G06V 10/454; G06V 10/50; G06V 10/52; G06V 10/82; G06V 20/00
See application file for complete search history.

(56) References Cited

U.S. PATENT DOCUMENTS

2023/0068502 A1* 3/2023 Pernias .................. G06N 20/00

FOREIGN PATENT DOCUMENTS

CN 113553988 A 10/2021

OTHER PUBLICATIONS

Wang ("MC-LCR: Multi-modal contrastive classification by locally correlated representations for effective face forgery detection" Apr. 1, 2022) arXiv:2110.03290v2 [cs.CV] Apr. 1, 2022 (Year: 2022).*
Grigoryan ("New look on quantum representation of images: Fourier transform representation" Mar. 21, 2020) Quantum Information Processing (2020) 19:148 (Year: 2020).*
Guo ("Hire-MLP: Vision MLP via Hierarchical Rearrangement" Nov. 30, 2021) arXiv:2108.13341v2 [cs.CV] Nov. 30, 2021 (Year: 2021).*

(Continued)

*Primary Examiner* — Usmaan Saeed
*Assistant Examiner* — Su-Ting Chuang
(74) *Attorney, Agent, or Firm* — Leydig, Voit & Mayer, Ltd.

(57) ABSTRACT

A method is provided for data processing based on a multi-layer perceptrons (MLP) architecture. The method comprises determining a plurality of tokens for a piece of data, generating an amplitude and a phase for each of the plurality of tokens, optimizing the plurality of tokens by mixing the plurality of tokens based on the amplitudes and the phases, and determining one or more features included in the piece of data based on the plurality of optimized tokens. Each token includes information associated with a segment of the piece of data.

20 Claims, 4 Drawing Sheets

(56) References Cited

OTHER PUBLICATIONS

Chen ("CycleMLP: A MLP-like Architecture for Dense Prediction" Mar. 18, 2022) arXiv:2107.10224v4 [cs.CV] Mar. 18, 2022 (Year: 2022).*
Tolstikhin ("MLP-Mixer: An all-MLP Architecture for Vision" Jun. 11, 2021) 35th Conference on Neural Information Processing Systems (NeurIPS 2021). (Year: 2021).*
Anand ("Quantum Image Processing") arXiv:2203.01831v1 [quant-ph] Mar. 1, 2022 (Year: 2022).*
Herdt ("Complex-Valued Multilayer Perceptron for Object Recognition in Polarimetric SAR Images") Von der Fakultät IV—Elektrotechnik und Informatik der Technischen Universität Berlin (Year: 2017).*
Tang et al., "An Image Patch is a Wave: Phase-Aware Vision MLP," 2022 IEEE/CVF Conference on Computer Vision and Pattern Recognition (CVPR), Total 10 pages, Institute of Electrical and Electronics Engineers, New York, New York (2022).

* cited by examiner

METHOD AND DEVICE FOR PROCESSING DATA BASED ON MULTI-LAYER PERCEPTRONS

TECHNICAL FIELD

This disclosure relates generally to computer vision technologies and, more specifically, to processing data using neural network technologies.

BACKGROUND

In computer vision and artificial intelligence, neural network architectures are often utilized to tackle various tasks, such as image classification, object detection, and semantic segmentation. Convolutional neural network ("CNN") has been dominant among these neural network architectures, due to the well-establishment and good performance of the CNN architectures. Recent work shows that Transformer architectures, which are attention-based models of network architectures, may provide comparably good results with respect to CNN architectures.

Implementation of a CNN or the Transformer architecture on terminal devices (e.g., laptops, smartphones, and autonomous vehicles) may be challenging, due to the high complexity of these architectures. The high complexity may require a computing power that is normally unaffordable by mobile devices and lead to a considerably large amount of computational cost, thus limiting the scope of implementing these neural network architectures.

On the other hand, neural network architectures based on multi-layer perceptrons ("MLPs"), such as MLP-Mixer, and Residual MLP ("ResMLP"), may be less computationally intensive compared with the CNN and Transformer architectures, because the MLP architectures involve less inductive bias. Thus, the MLP architectures may be applied to a wider range of tasks. However, the performance of existing MLP architectures is still inferior to that of the state-of-the-art ("SOTA") Transformer and CNN architectures. One of the bottlenecks for the existing MLP architectures lies in its manner of aggregating different tokens. Tokens are basic units, such as image blocks, processed by the MLP architectures. In existing MLP architectures, different tokens are aggregated with fixed weights. In other words, the same weights are used for tokens associated with different inputs (e.g., image blocks). For example, various tokens may include different semantic information associated with different input images. However, these differences of the semantic information among the tokens may be overlooked because of the fixed weights provided by the existing MLP architectures, thus causing deteriorated results when aggregating tokens for different input images.

As the foregoing illustrates, there is a need to develop a technology that supports implementations of the MLP architectures in data processing, such as computer vision techniques, with reduced computational cost and improved performance.

SUMMARY

A method, device and computer-readable medium are disclosed herein for data processing based on a multi-layer perceptron ("MLP") architecture with reduced computational cost and improved performance.

In an exemplary embodiment, the present disclosure provides a method for data processing based on a multi-layer perceptrons (MLP) architecture. The method comprises determining a plurality of tokens for a piece of data, generating an amplitude and a phase for each of the plurality of tokens, optimizing the plurality of tokens by mixing the plurality of tokens based on the amplitudes and the phases, and determining one or more features included in the piece of data based on the plurality of optimized tokens. Each token including information associated with a segment of the piece of data.

In a further exemplary embodiment, the generating an amplitude and a phase for each of the plurality of tokens further comprises extracting the information associated with each token for the plurality of tokens, and determining the amplitude and the phase for the token based on the information associated with each token.

In a further exemplary embodiment, the information associated with the token comprises at least one feature of the one or more features included in the piece of data. The amplitude for the token represents the at least one feature in the token. The phase for the token is related to differences between the token and other tokens in the plurality of tokens.

In a further exemplary embodiment, the extraction of the information associated with each token for the plurality of tokens is performed by a number of fully-connected (FC) layers included in the MLP architecture, and the number of FC layers are connected by at least one non-linear activation function.

In a further exemplary embodiment, the method further comprises normalizing the plurality of tokens.

In a further exemplary embodiment, the optimizing the plurality of tokens by mixing the plurality of tokens based on the amplitudes and the phases further comprises superposing the plurality of tokens based on the amplitudes and the phases to mix the plurality of tokens, and determining optimized amplitudes for the optimized tokens based on the phases for the plurality of tokens.

In a further exemplary embodiment, the piece of data is an image, and each token is an image patch comprising a subset of pixels in the image. The method further comprises generating a plurality of feature maps corresponding to the plurality of tokens, each token carrying information in the corresponding feature map. Each feature map includes spatial information along height, spatial information along width and information of a number of channels associated with the image.

In a further exemplary embodiment, the MLP architecture includes a sub-network. The sub-network includes a plurality of branches to process the plurality of tokens in parallel. A first branch of the plurality of branches is used to aggregate the spatial information along height corresponding to the plurality of tokens. A second branch of the plurality of branches is used to aggregate the spatial information along width corresponding to the plurality of tokens. A third branch of the plurality of branches is used to preserve original information in the plurality of tokens.

In a further exemplary embodiment, the plurality of tokens are processed by a number of iterations by using the MLP.

In a further exemplary embodiment, the piece of data is an image, and each token is an image patch comprising a subset of pixels in the image. The method further comprises identifying one or more objects in the image based on the one or more features included in the piece of data, and classifying the image among a plurality of images based on the one or more objects.

In a further exemplary embodiment, the piece of data is one of audio data, video data, graphic data, and contextual data.

In another exemplary embodiment, the present disclosure provides a device for data processing based on a multi-layer perceptrons (MLP) architecture. The device comprises one or more processors, and a non-transitory computer-readable medium, having computer-executable instructions stored thereon. The computer-executable instructions, when executed by one or more processors, cause the one or more processors to facilitate determining a plurality of tokens for a piece of data, generating an amplitude and a phase for each of the plurality of tokens, optimizing the plurality of tokens by mixing the plurality of tokens based on the amplitudes and the phases, and determining one or more features included in the piece of data based on the plurality of optimized tokens. Each token including information associated with a segment of the piece of data.

In a further exemplary embodiment, the generating an amplitude and a phase for each of the plurality of tokens further comprises extracting the information associated with each token for the plurality of toke, and determining the amplitude and the phase for the token based on the information associated with each token.

In a further exemplary embodiment, the information associated with the token comprises at least one feature of the one or more features included in the piece of data. The amplitude for the token represents the at least one feature in the token. The phase for the token is related to differences between the token and other tokens in the plurality of tokens.

In a further exemplary embodiment, the extraction of the information associated with each token for the plurality of tokens is performed by a number of fully-connected (FC) layers included in the MLP architecture, and the number of FC layers are connected by at least one non-linear activation function.

In a further exemplary embodiment, the optimizing the plurality of tokens by mixing the plurality of tokens based on the amplitudes and the phases further comprises superposing the plurality of tokens based on the amplitudes and the phases to mix the plurality of tokens, and determining optimized amplitudes for the optimized tokens based on the phases for the plurality of tokens.

In a further exemplary embodiment, the piece of data is an image, and each token is an image patch comprising a subset of pixels in the image. The computer-executable instructions, when executed by one or more processors, cause the one or more processors to further facilitate generating a plurality of feature maps corresponding to the plurality of tokens, each token carrying information in the corresponding feature map. Each feature map includes spatial information along height, spatial information along width and information of a number of channels associated with the image.

In a further exemplary embodiment, the MLP architecture includes a sub-network, and the sub-network includes a plurality of branches to process the plurality of tokens in parallel. A first branch of the plurality of branches is used to aggregate the spatial information along height corresponding to the plurality of tokens. A second branch of the plurality of branches is used to aggregate the spatial information along width corresponding to the plurality of tokens. A third branch of the plurality of branches is used to preserve original information in the plurality of tokens.

In a further exemplary embodiment, the piece of data is an image, and each token is an image patch comprising a subset of pixels in the image. The computer-executable instructions, when executed by one or more processors, cause the one or more processors to further facilitate identifying one or more objects in the image based on the one or more features included in the piece of data, and classifying the image among a plurality of images based on the one or more objects.

In yet another exemplary embodiment, the present disclosure provides a non-transitory computer-readable medium having processor-executable instructions stored thereon for data processing based on a multi-layer perceptrons (MLP) architecture. The computer-executable instructions, when executed by one or more processors, cause the one or more processors to facilitate determining a plurality of tokens for a piece of data, generating an amplitude and a phase for each of the plurality of tokens, optimizing the plurality of tokens by mixing the plurality of tokens based on the amplitudes and the phases, and determining one or more features included in the piece of data based on the plurality of optimized tokens. Each token including information associated with a segment of the piece of data.

BRIEF DESCRIPTION OF THE DRAWINGS

The device and method for data processing are described in detail below with reference to the attached drawing figures, wherein.

DETAILED DESCRIPTION

Figure 1A:
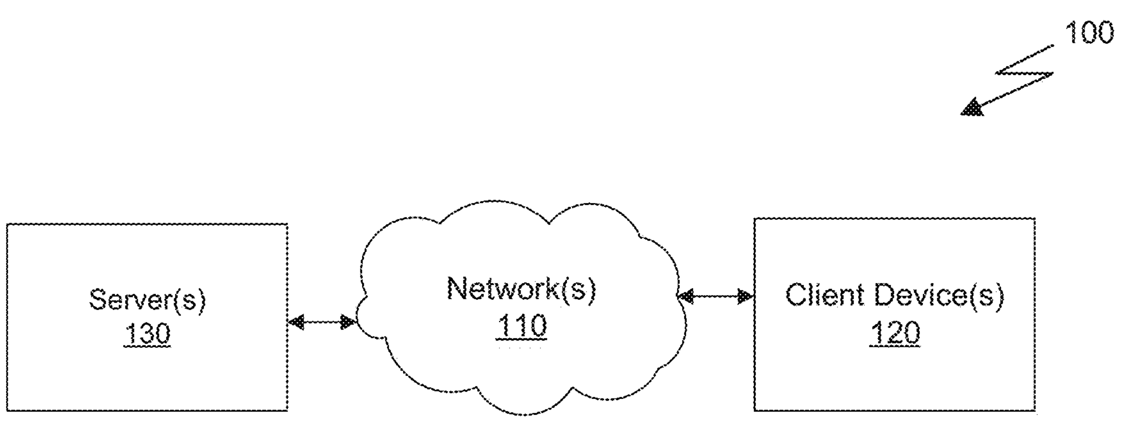
FIG. 1A illustrates an exemplary network environment, in accordance with some embodiments.

Devices and methods are disclosed related to implementations of neural network architectures based on multi-layer perceptrons ("MLP"), in which tokens are re-parameterized into a complex form to modulate weights in the neural network architectures, such that the MLP-based neural network architectures can adapt to variations of different inputs so as to improve the performance of the MLP-based neural network architectures.

In some embodiments, a computing device (e.g., a terminal device, a smartphone, a laptop, a server, or the like) obtains a plurality of tokens for a piece of data (e.g., an image, a piece of audio/video, or a piece of contextual data). Each of the tokens may be generated as a segment of the piece of data, which serves as the basic units to be processed by the computing device. As such, each token includes information (e.g., features or contents) associated with a portion of the piece of data. For example, a token may be defined as a patch that includes 16×16 pixels included in an input image. The computing device may implement an MLP-based neural network architecture, referred to as an MLP architecture, to process the plurality of tokens.

First, the computing device may normalize the plurality of tokens. Second, the computing device may process the normalized tokens using one or more Phase-Aware Token-Mixing ("PATM") modules embedded therein. The PATM may generate an amplitude and a phase for a corresponding token. In this way, each token may be parameterized into a complex form, which is referred to as a wave-like token. Subsequently, the PATM module may mix the plurality of wave-like tokens by performing superposition so as to aggregate information contained in the plurality of tokens and obtain a plurality of optimized tokens. The phase differences between the tokens may cause modulations to the amplitudes of the optimized tokens, which is in addition to the modulations caused by the fixed weights of the MLP architecture. For instance, features associated with small phase differences may be enhanced, whereas features associated with large phase differences may be diminished, which is analogous to an interference phenomenon caused by coherent light. As a result, the computing device may obtain a plurality of optimized tokens corresponding to the plurality of tokens. Third, the computing device may further normalize the plurality of optimized tokens followed by a channel-mixing process that extracts features from each of the plurality of optimized tokens.

In some examples, the MLP architecture may include one or more sub-networks to facilitate the above-mentioned processes of normalizations, token-mixing, and/or channel-mixing. In some instances, the computing device may perform a number of iterations in one or more of the aforementioned processes by stacking fully-connected ("FC") layers in one or more sub-networks of the MLP architecture. In some variations, the above-mentioned processes of normalizations, token-mixing, and/or channel-mixing may form one stage of data processing, and the computing device may perform multiple stages of the data processing to further improve performance. In some examples, various parameters of the MLP architectures, such as a window size to restrict the size of FC layers to be connected to the tokens, may be adjusted so as to balance between the computational cost and the overall performance of data processing.

FIG. 1A illustrates an exemplary network environment 100, in accordance with one or more examples in the present disclosure. Image processing techniques implementing the MLP architectures disclosed herein may take place in the exemplary network environment 100. Network environments suitable for use in implementing embodiments of the disclosure may include one or more client devices 120, servers 130, and/or other device types.

Components of a network environment may communicate with each other via a network(s) 110, which may be wired, wireless, or both. By way of example, network 110 may include one or more Wide Area Networks ("WANs"), one or more Local Area Networks ("LANs"), one or more public networks such as the Internet, and/or one or more private networks. Where the network includes a wireless telecommunications network, components such as a base station, a communications tower, access points, or other components may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces ("APIs")). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). A cloud-based network environment may be private (e.g., limited to a single organization), may be public (e.g., available to many organizations), and/or a combination thereof (e.g., a hybrid cloud environment).

Figure 1B:
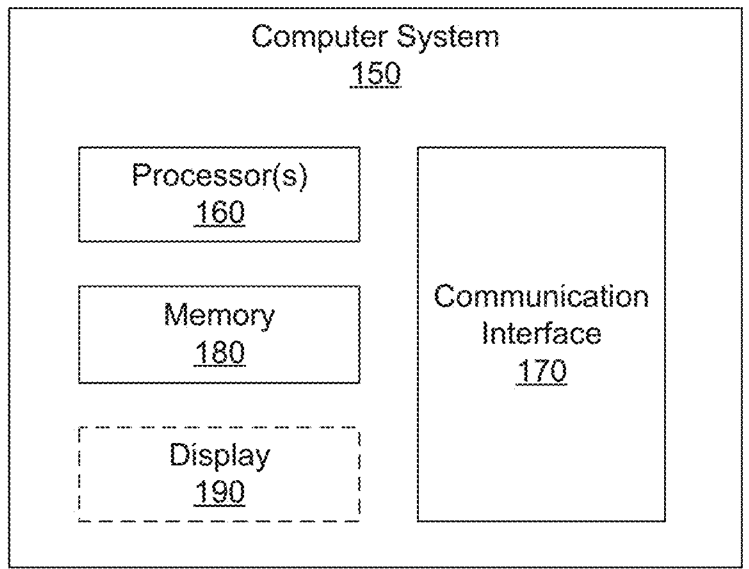
FIG. 1B illustrates an exemplary computer system, in accordance with some embodiments.

Client device(s) 120 may include at least some of the components, features, and functionality of the example computer system 150 of FIG. 1B. By way of example and not limitation, a client device 120 may be embodied as a Personal Computer ("PC"), a laptop computer, a mobile device, a smartphone, a tablet computer, a virtual reality headset, a video player, a video camera, a vehicle, a virtual machine, a drone, a robot, a handheld communications device, a vehicle computer system, an embedded system controller, a workstation, an edge device, any combination of these delineated devices, or any other suitable device.

FIG. 1B illustrates a block diagram of an exemplary computer system 150 configured to implement various functions according to one or more embodiments in the present disclosure. In some examples, computer system 150 may be implemented in a client device 120 or a server 130 in network environment 100 as shown in FIG. 1A. A client device 120 or server 130 implemented with computing system 150 therein may be utilized as a computing device to perform the processes in the present disclosure.

As shown in FIG. 1B, computer system 150 may include one or more processors 160, a communication interface 170, a memory 180, and a display 190. Processor(s) 160 may be configured to perform the operations in accordance with the instructions stored in memory 180. Processor(s) 160 may include any appropriate type of general-purpose or special-purpose microprocessor (e.g., a CPU or GPU, respectively), digital signal processor, microcontroller, or the like. Memory 180 may be configured to store computer-readable instructions that, when executed by processor(s) 160, can cause processor(s) 160 to perform various operations disclosed herein. Memory 180 may be any non-transitory type of mass storage, such as volatile or non-volatile, magnetic, semiconductor-based, tape-based, optical, removable, non-removable, or other type of storage device or tangible computer-readable medium including, but not limited to, a read-only memory ("ROM"), a flash memory, a dynamic random-access memory ("RAM"), and/or a static RAM.

Communication interface 170 may be configured to communicate information between computer system 150 and other devices or systems, such as client device 120 and/or server 130 as show in FIG. 1A. For example, communication interface 170 may include an integrated services digital network ("ISDN") card, a cable modem, a satellite modem, or a modem to provide a data communication connection. As another example, communication interface 170 may include a local area network ("LAN") card to provide a data communication connection to a compatible LAN. As a further example, communication interface 170 may include a high-speed network adapter such as a fiber optic network adaptor, 10G Ethernet adaptor, or the like. Wireless links can also be implemented by communication interface 170. In such an implementation, communication interface 170 can send and receive electrical, electromagnetic or optical signals that carry digital data streams representing various types of information via a network. The network can typically include a cellular communication network, a Wireless Local Area Network ("WLAN"), a Wide Area Network ("WAN"), or the like.

Communication interface 170 may also include various I/O devices such as a keyboard, a mouse, a touchpad, a touch screen, a microphone, a camera, a biosensor, etc. A user may input data to computer system 150 (e.g., a terminal device) through communication interface 170.

Display 190 may be integrated as part of computer system 150 or may be provided as a separate device communicatively coupled to computer system 150. Display 190 may include a display device such as a Liquid Crystal Display ("LCD"), a Light Emitting Diode Display ("LED"), a plasma display, or any other type of display, and provide a Graphical User Interface ("GUI") presented on the display for user input and data depiction. In some embodiments, display 190 may be integrated as part of communication interface 170.

A MLP architecture is a type of neural network architecture, which may include fully-connected ("FC") layers and one or more non-linear activation functions, according to some embodiments. Each pair of adjacent FC layers may be connected by a non-linear activation function. According to an embodiment, a vision MLP architecture, that is an MLP architecture applied in a computer vision system, first splits an image into multiple patches. Each image patch may be called a token in some embodiments and include a segment of a piece of data, which is used as a basic unit in data processing based on the MLP architecture described herein. The MLP architecture may then extract features from the tokens. The aforementioned processes of splitting and extraction may be performed by sub-networks called channel-FC and token-FC included in the vision MLP architecture, respectively.

The channel-FC sub-network (or the channel-FC network) extracts features from a plurality of tokens. For instance, when a piece of data is segmented into n number of tokens, the information of a feature included in the piece of data may be distributed across the n number of tokens. The set of tokens associated with an input piece of data, which is denoted by Z, may be expressed as $Z=[z_1, z_2, \ldots, z_n]$, where $z_j$ represents a $j^{th}$ token, and j and n are integers. When the value of each token $z_j$ is the feature included in the token $z_j$. The process performed by the channel-FC network is formulated as:

$$\text{Channel}-FC(z_j, W^c) = W^c z_j,\ j = 1, 2, \cdots n, \quad \text{Eq. (1)}$$

where $W^c$ represents the weight of the channel-FC network, which includes learnable parameters embedded in the channel-FC network. The channel-FC network processes each of the plurality of tokens independently to extract information (e.g., the feature) from the respective token. In some examples, the channel-FC network may include more than two FC layers, which are connected by multiple non-linear activation functions, so as to enhance the performance of feature extraction. The channel-FC network with stacked FC layers may construct a channel-mixing network.

The token-FC sub-network (or the token-FC network) may aggregate information from different tokens. For example, the process performed by the channel-FC sub-network is formulated as:

$$\text{Token}-FC(Z, W^t)_j = \sum_k W^t_{jk} \odot z_k,\ j = 1, 2, \cdots n, \quad \text{Eq. (2)}$$

where $W^t$ represents the weight of the token-FC network, which includes learnable parameters embedded in the token-FC network, $\odot$ denotes per-element multiplication, and j indicates the parameters associated with the $j^{th}$ token. The token-FC network may capture spatial information in the set of tokens Z by mixing the information included in the tokens. Similar to the channel-mixing MLP network, a token-mixing MLP network may be constructed by stacking FC layers, connected by one or more non-linear activation functions.

A token-mixing MLP network may be constructed based on existing MLP architectures, such as MLP-Mixer, and Residual MLP ("ResMLP"). However, the existing MLP architectures uses fixed weights to process the tokens, resulting in negligence of variations (e.g., different semantic contents) across different tokens from different inputs. For instance, a number of images may capture a same set of objects from different perspectives, causing the set of objects displayed at different locations in the plurality of images. To this end, using a token-mixing MLP network with fixed weights to process the tokens associated with these input images may not always yield good results.

The MLP architectures disclosed herein implement processes of re-parameterizing the tokens into a complex form including an amplitude and a phase, and superposing the tokens based on the corresponding amplitudes and phases. As a result, in addition to the modulation by the fixed weights of a MLP architecture (e.g., by a token-mixing MLP network in the MLP architecture) the tokens may be further modulated based on the phases, thus improving the performance of the MLP architecture. A token in a complex form, referred to as a wave-like token, may be represented by an amplitude and a phase, analogous to the concept of a wave in quantum mechanics. Accordingly, the MLP architectures disclosed here that process wave-like tokens may be referred to as Wave-MLP architectures.

Figure 2:
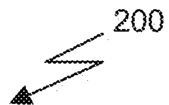
FIG. 2 illustrates an exemplary process of data processing based on an MLP architecture, in accordance with some embodiments.
Figure 2:
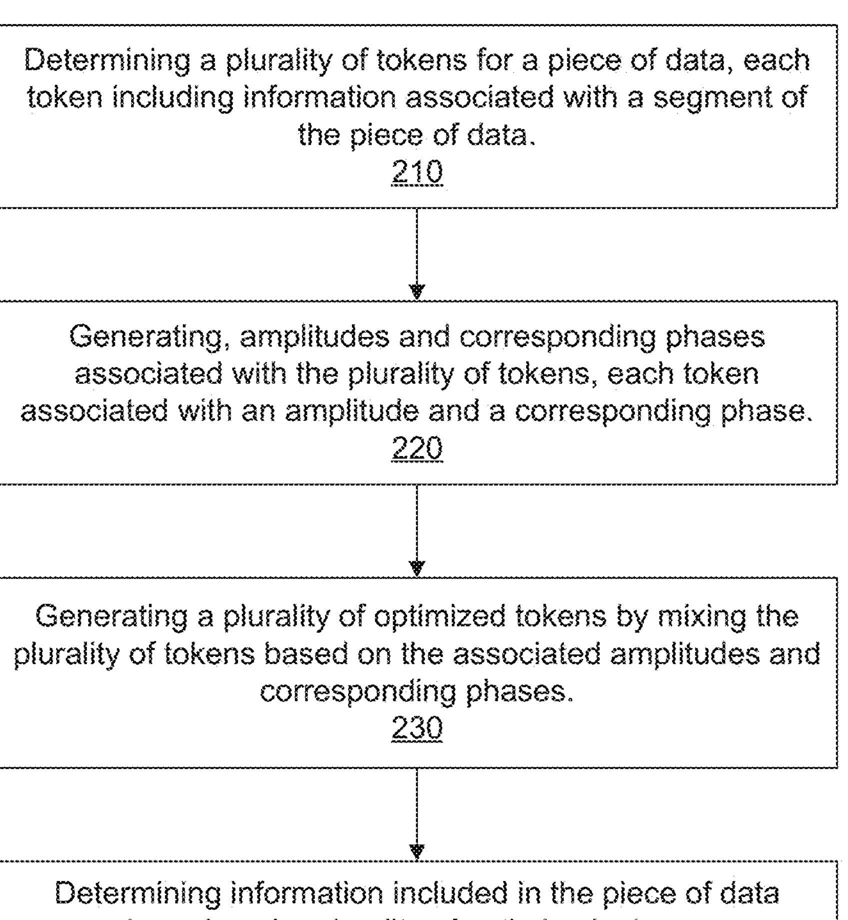

FIG. 2 illustrates an exemplary process 200 of data processing, in accordance with one or more examples of the present disclosure. Process 200 may be performed by a computing device including computer system 150 as illustrated in FIG. 1B, which may be embodied as a client device 120 and/or a server 130 in network environment 100 as depicted in FIG. 1A. Process 200 may be performed alone or in combination with other processes in the present disclosure. It will be recognized that process 200 may be performed in any suitable environment and in any suitable order.

The computing device may process a piece of data so as to extract valuable information therefrom. For example, the piece of data may be an image or an image frame in a video, and the computing device may recognize one or more objects from the image, such as a cat, a dog, a person, etc., by implementing the Wave-MLP architectures as described in the present disclosure. The computing device may use the extracted information in various applications, such as grouping photos in a user's photo album, and generating notifications in autonomous driving. As another example, the piece of data may include contextual information, and the computing device may recognize one or more subjects in the contextual information, such as a question asking about current time or schedules of the day, etc., by implementing the Wave-MLP architectures as described in the present disclosure. Based on a recognized question, the computing device may further generate an answer to the question.

At step 210, the computing device may determine a plurality of tokens based on a piece of data. Each token includes information associated with a segment of the piece of data. For instance, the piece of data may be an image including 1024×1024 pixels, while a token may be defined as an image patch including 16×16 pixels. In this way, the computer system may generate a total number of 4096 tokens. In some embodiments, the computing device may perform preprocesses on the plurality of tokens, for example, to normalize the tokens by passing the tokens through a number of FC layers for normalization.

At step 220, the computing device generates amplitudes and phases for the plurality of tokens. Each token may be associated with an amplitude and a corresponding phase. In some embodiments, the amplitude and corresponding phase associated with the token are determined based on the information included in the token, such as features, semantic contents, etc.

When written in a complex form, the $j^{th}$ token may be represented by $|z_j| \odot e^{i\theta_j}$. The amplitude of the token has a positive real value, which may be denoted as $|z_j|$. In some embodiments, $z_j$ is a vector, which includes a number of elements. The operator $\odot$ indicates a per-element multiplication. The phase term, denoted as $\theta_j$, is included in the expression of $e^{i\theta_j}$, which is a periodic function with a unit modulus. The phase term ($\theta_j$), which is measured in an angular unit (e.g., degrees or radians), represents a current location of the token in a wave-like period. The $j^{th}$ token in the complex form may be denoted as $\tilde{z}_J$, which may be formulated as, $$\tilde{z}_J = |z_j| \odot e^{i\theta_j},\ j = 1, 2, \ldots, n. \qquad \text{Eq. (3)}$$

In some embodiments, the amplitude $|z_j|$ of the $j^{th}$ token may represent the content/feature included in the $j^{th}$ token. In order to calculate the amplitude $|z_j|$ of the token, the computing device may first extract the feature from the token $z_j$ by applying Equation 1 presented above. The features included in the n number of tokens may be denoted as $X=[x_1, x_2, \ldots, x_n]$, where $x_j$ denotes a feature associated with the token $z_j$. As such, the computing device may calculate $z_j$ by applying, $$z_j = \text{Channel} - FC(x_j, W^c),\ j = 1, 2, \cdots, n. \qquad \text{Eq. (4)}$$

Then, the computing device may determine an absolute value of the extracted feature of the token to obtain $|z_j|$. The feature of the token $z_j$ may be represented by a vector including a number of elements. To this end, the computing device may calculate each of the elements of the feature $z_j$ by applying Equation 1. The $t^{th}$ element of the vector may be denoted as $z_{j,t}$, where t is an integer and $z_{j,t}$ is a real number. Subsequently, the computing device may take an absolute value of $z_{j,t}$. If $z_{j,t}>0$, $|z_{j,t}|=z_{j,t}$. If $z_{j,t}<0$, $|z_{j,t}|=z_{j,t}e^{i\pi}$. In other words, applying an absolute operation upon the elements with positive values results in the same values of these elements, whereas applying the absolute operation upon the elements with negative values is equivalent to adding a phase term $e^{i\pi}$ to each of the elements with negative values. The added phase term $e^{i\pi}$ may be absorbed into the phase determined for the corresponding token. In this way, the computing device may obtain the amplitudes for the tokens or the elements of the tokens without actually performing absolute operations upon the tokens, thus simplifying the computational process.

The phase of the token may indicate the current location of the wave-like token in a wave period. In some embodiments, the computing device may use a predefined parameter(s) to represent the phase $\theta_j$ of each token or the phases associated with the elements in the vector associated with the token. The predefined parameters are referred to as static phases in the present disclosure. In some instances, the static phases may be learnt via a training process. The static phases may provide a simple way of modulating the fixed weights in the MLP architectures by taking into account the variations among the tokens associated with an input (e.g., an image). As such, the data processing utilizing the static phases may achieve an improved performance without drastically increasing the computational cost. In some variations, the computing device may obtain different sets of static phases when processing different inputs. Particularly, a set of static phases may be trained for an input and used for processing a plurality of inputs that are similar to the input associated with the set of static phases.

In some embodiments, the computing device may determine the phases for the plurality of tokens based on the features in each of the tokens, which are denoted as dynamic phases. The computing device may determine the dynamic phases by capturing particular attributes of the tokens, for example, the variation of the features among the tokens. The computing device may implement an estimation module (denoted as $\Theta$) to generate the dynamic phases for the tokens. Assuming the $j^{th}$ token includes a feature $x_j$, the estimation module may calculate the corresponding phase by applying $\theta_j=\Theta(x_j, W^\theta)$, where $W^\theta$ represents learnable parameters in the estimation module. Various technologies may be implemented in the estimation module to calculate the phases associated with the corresponding tokens. As an example, the estimation module may adopt the process described by Equation 1 to calculate the phases. Since the process based on Equation 1 may extract features from the tokens, the estimation module may determine the phases based on the differences between the features associated with the tokens. Similar features may result in smaller phase differences between tokens, whereas different features may result in large phase differences between tokens. During a token-mixing process, tokens with close phases tend to enhance each other, which signifies the features included in these tokens.

At step 230, the computing device may generate a plurality of optimized tokens by mixing the plurality of tokens based on the associated amplitudes and corresponding phases. In some embodiments, the computing device may perform the mixing by superposing the plurality of wave-like tokens.

Similar to the superposition of waves, different wave-like tokens may be aggregated by performing superposition. The computing device may unfold the expression of a wave-like token as demonstrated in Equation 3 by applying Euler's formula. As a result, the expression of the $j^{th}$ token may be rewritten into the following form, $$\tilde{z}_j = |z_j| \odot \cos\theta_j + i|z_j| \odot \sin\theta_j,\ j = 1, 2, \cdots, n. \quad \text{Eq. (5)}$$

To illustrate, two wave-like tokens $\tilde{z}_1$ and $\tilde{z}_2$ are aggregated to obtain an output, denoted as $\tilde{z}_r = \tilde{z}_1 + \tilde{z}_2$. The wave-like tokens $\tilde{z}_1$ and $\tilde{z}_2$ may be expressed by Equation 5. The amplitude $|z_r|$ can be calculated by the following equation, $$|z_r| = \sqrt{|z_1|^2 + |z_2|^2 + 2|z_1| \odot |z_2| \odot \cos(\theta_2 - \theta_1)}, \quad \text{Eq. (6)}$$

The phase $\theta_r$ can be calculated by the following equation, $$\theta_r = \theta_1 + \text{atan2}(|z_2|\sin \odot (\theta_2 - \theta_1), |z_1|(|z_2| + \cos \odot (\theta_2 - \theta_1)), \quad \text{Eq. (7)}$$

where the function of atan 2(x, y) is a two-argument arctangent function. As demonstrated in Equation 5, the phase difference $|\theta_2 - \theta_1|$ between the two tokens $\tilde{z}_1$ and $\tilde{z}_2$ may affect the result of the amplitude $|z_r|$ of $\tilde{z}_r$, which is equivalent to modulating the fixed weights of the MLP architectures.

In a more general case, according to some embodiments, the computing device may mix the n number of wave-like tokens by implementing the wave-like tokens in Equation 2, which is derived as, $$\tilde{o}_j = Token - FC(\tilde{Z}, W^t)_j,\ j = 1, 2, \cdots, n, \quad \text{Eq. (8)}$$

where $\tilde{Z} = [\tilde{z}_1, \tilde{z}_2, \ldots, \tilde{z}_n]$ denotes all the wave-like tokens in a layer of the MLP architecture. In Equation 8, different tokens interact with each other, which is similar to interactions between waves. The output $\tilde{o}_j$ is a complex-value, which represents an optimized value for the $j^{th}$ token based on the aggregated features among the n number of tokens. The computing device may calculate the real-value $o_j$ of the output $\tilde{o}_j$ by implementing the following formula, $$o_j = \sum_k W^t_{jk} z_k \odot \cos\theta_k + W^i_{jk} z_k \odot \sin\theta_k,\ j = 1, 2, \ldots, n, \quad \text{Eq. (9)}$$

where $W^t$, $W^i$ are both learnable weights in the MLP architecture. Particularly, $W^i$ is associated with the imaginary part of a respective element in a respective wave-like token. In Equation 9, it demonstrates summation of the real and imaginary part $\tilde{o}_j$ with the respective weights $W^t$ and $W^i$. In this way, the computing device may generate the optimized values for the n number of tokens. Based on Equation 9, the phase $\theta_k$ may dynamically adjust the real-value $o_j$ of the output $\tilde{o}_j$ according to the information (e.g., the semantic content) included in the input data. As such, the phases associated with the wave-like tokens may module the aggregation process of different tokens in addition to the fixed weights provided by the MLP architecture.

In some variations, the computing device may stack multiple layers of MLP to repeat step 220 and 230 for a number of iterations, so as to enhance the results of mixing the spatial information among the plurality of tokens.

At step 240, the computing device may determine information included in the piece of data based on the plurality of optimized tokens. In some embodiments, the computing device may normalize the optimized tokens obtained from step 230. Additionally and/or alternatively, the computing device may implement a channel-mixing MLP network to extract features from the optimized tokens. In some variations, the computing device may use the extracted features from the tokens to take further actions to the piece of data, for example to classify the piece of data.

Figure 3:
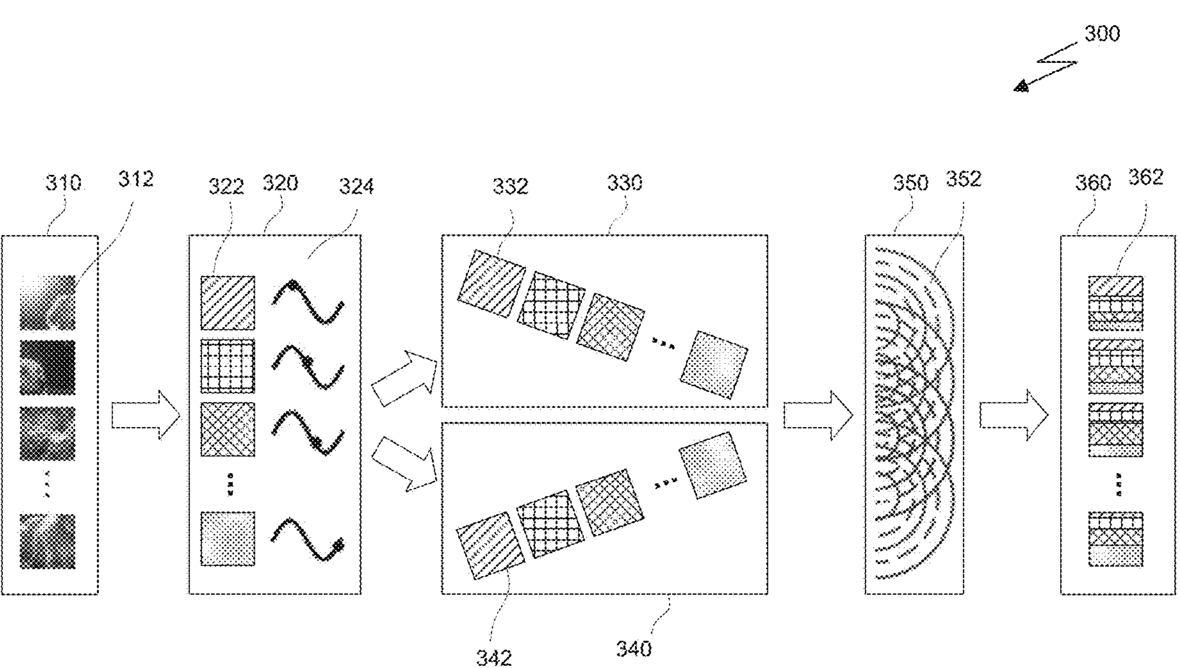
FIG. 3 illustrates an exemplary process of processing graphic data using a phase-aware token-mixing ("PATM") module, in accordance with some embodiments.

FIG. 3 illustrates an exemplary process 300 of processing graphic data using a phase-aware token-mixing ("PATM") module included in the computing device described in process 200, in accordance with one or more examples of the present disclosure. The PATM module in the computing device may include hardware and/or software components to implement steps 220 and 230 of process 200 as shown in FIG. 2. The hardware components may include one or more processors, a non-transitory computer-readable medium and other hardware components. The software components may include computer-executable instructions stored in a non-transitory computer-readable medium. It will be appreciated by one of ordinary skill in the art that the PATM module in the computing device may be implemented to process other types of input data, such as contextual data, audio/video data, etc. To illustrate, the graphic data processed by the PATM module is embodied as an image. The computing device 200 may generate a plurality of tokens (e.g., 312 in FIG. 3) based on the image input into the computing device.

As shown in FIG. 3, block 310 may include a plurality of tokens (e.g., 312) as inputs to the PATM module. The PATM module generates an amplitude and a phase for each of the tokens as shown in block 320. For instance, the PATM module generates an amplitude 322 and a phase 324 for token 312. The generation process may be referred to step 220 of process 200 as shown in FIG. 2. As a result, each of the tokens may be parameterized into a wave-like token formulated by Equation 3.

In the next step, the PATM module unfolds each of the wave-like tokens by applying Equation 5. As a result, the expression of each wave-like token includes a real part and an imaginary part. For example, token 312 is associated with a real part 332 in block 330 and an imaginary part 342 in block 340. As visualized in FIG. 3, for example, the real parts and the imaginary parts associated with the wave-like tokens may be separated into blocks 330 and 340, respectively.

As shown in block 350, the PATM module mixes the wave-like tokens by performing step 230 of process 200 as shown in FIG. 2. Referring back to FIG. 3, each wave-like token may be visualized as a wave, such as a wave 352 associated with token 312. The amplitude of a wave associated with a token is spatially varied, due to the modulation caused by the corresponding phase. The PATM module superposes the waves associated with the plurality of tokens in block 310 so as to obtain a plurality of optimized tokens as shown in block 360. For example, an optimized token 362 may be associated with token 312. Each of the optimized tokens in block 362 may be modulated based on the phases associated with the plurality of tokens (e.g., in block 310) processed by the PATM module in a same batch (e.g., in the same layer of the MLP architecture implemented in the computing device).

Figure 4A:
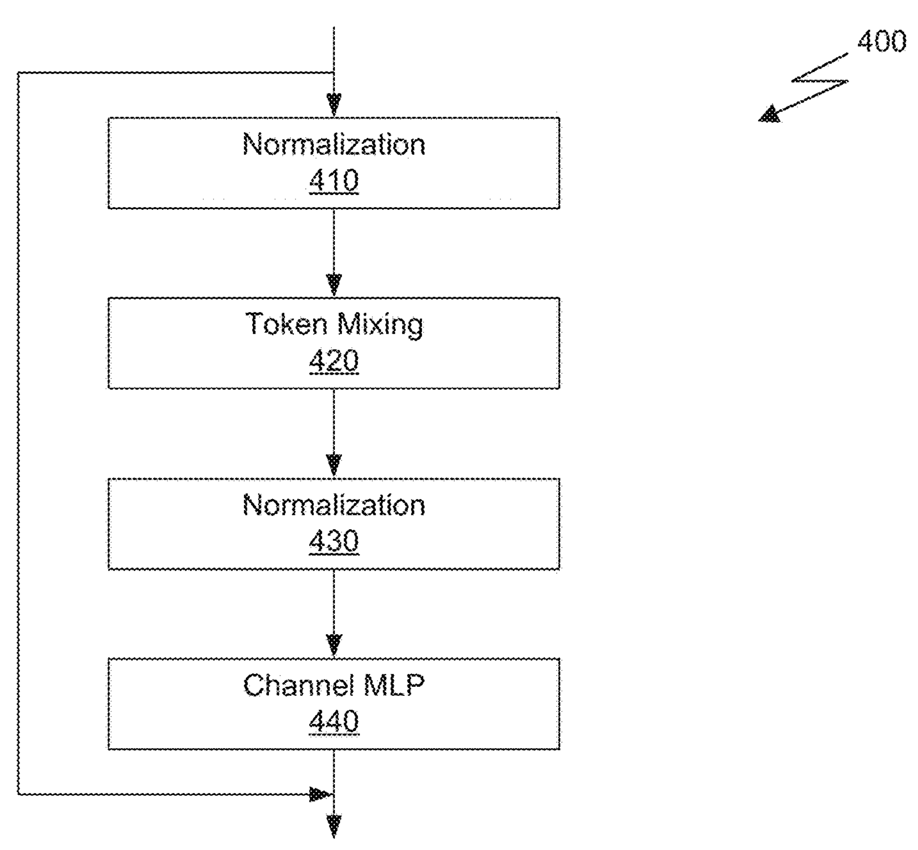
FIG. 4A illustrates an exemplary process of processing data, in accordance with some embodiments.

FIG. 4A illustrates an exemplary process 400 of processing data using the computing device described in process 200, in accordance with one or more examples of the present disclosure. The steps demonstrated in FIG. 4A for process 400 may be performed alone or in combination with other processes in the present disclosure. It will be recognized that the steps of process 400 may be performed in any suitable environment and in any suitable order.

In some embodiments, the computing device may implement an MLP architecture that includes one or more sub-networks to facilitate one or more steps as demonstrated in process 400. In some embodiments, the computing device may implement multiple MLP architectures to facilitate one or more steps in process 400. It will be appreciated that one or more steps (e.g., normalization 410/430) in process 400 may also be facilitated by other types of calculations, such as normalization based on the minimum and maximum values of a dataset.

In some embodiments, the computing device may obtain a plurality of tokens based on a piece of data. Each of the plurality of tokens may be a segment of the piece of data. For example, the piece of data may be embodied as an image, and a token may be embodied as an image patch that includes a subset of pixels in the image.

At step 410, the computing device may normalize the plurality of tokens. In some examples, the normalization may be performed via a sub-network in the MLP architecture implemented in the computing device as disclosed herein. The sub-network for normalization may include at least two FC layers and one or more non-linear activation function connecting the FC layers.

At step 420, the computing device may mix the normalized tokens obtained at step 410. In this step, the computing device may first perform step 220 of process 200 as shown in FIG. 2 to parameterize the normalized tokens into wave-like tokens. Then, the computing device may perform step 230 of process 200 to mix the wave-like tokens. In some embodiments, the computing device may include an aforementioned PATM module to carry on the process demonstrated in process 300 as shown in FIG. 3, so as to obtain a plurality of optimized tokens. In some embodiments, the computing device may implement two or more PATM modules, and optionally other components, such as a channel-FC network for feature extraction, to facilitate step 420.

At step 430, the computing device may normalize the plurality of optimized tokens. The computing device performs similar operations as described in step 410 to facilitate this step. Similar to step 410, the computing device may implement a sub-network for normalization, which may be a separate sub-network from the one described in step 410.

At step 440, the computing device may process the optimized tokens using a channel MLP sub-network. The channel MLP sub-network may be a channel-mixing MLP network including multiple FC layers to extract features from the optimized tokens. The process of feature extraction may be performed according to Equation 1 presented above. The computing device may implement the channel MLP sub-network to extract features from the optimized tokens.

In some embodiments, the steps of process 400 may be embodied as one stage of data processing. The MLP architecture implemented in the computing device may include multiple stages that are stacked together, such that the tokens associated with an input piece of data may be processed multiple times via the multiple stages so as to enhance the features in the tokens, thus achieving better performance in the extraction of features.

In some examples, the computing device may perform further processes on the input piece of data based on features in the original tokens (that is tokens obtained before processed by steps 410-440 in process 400) and the extracted features from the optimized tokens (that is outputs from step 440).

Figure 4B:
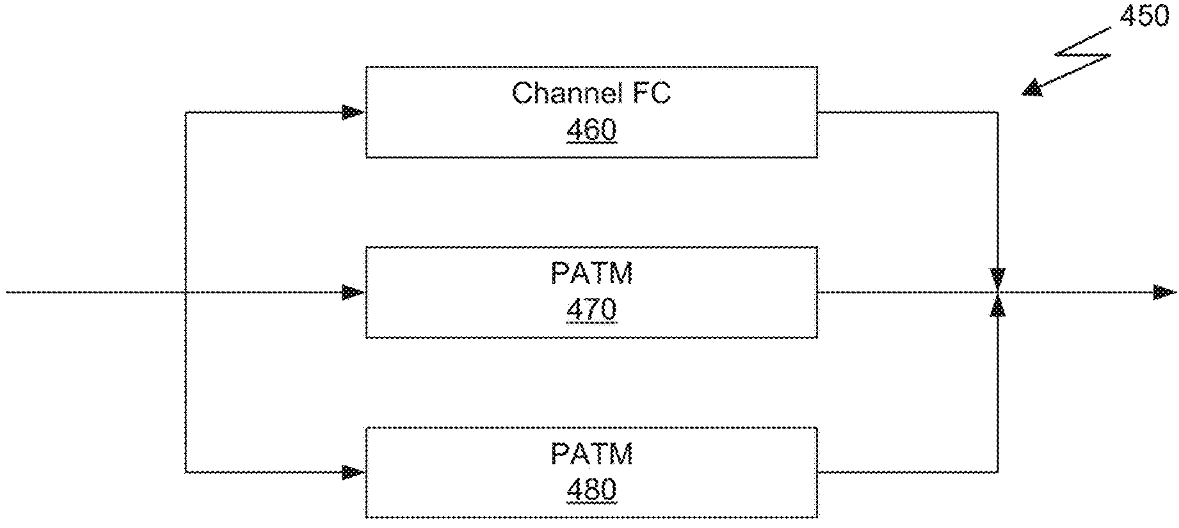
FIG. 4B is an exemplary process included in the step of token mixing shown in FIG. 4A, in accordance with some embodiments.

FIG. 4B is a process 450 further performed at step 420 of process 400 as shown in FIG. 4A, in accordance one or more examples in the present disclosure. Process 450 may be performed by the computing device as described in process 200 of FIG. 2. Process 450 may be performed alone or in combination with other processes in the present disclosure. It will be recognized that processes of process 450 may be performed in any suitable environment and in any suitable order.

As shown in FIG. 4B, process 450 includes multiple branches that may operate in parallel. A plurality of tokens may be input into the multiple branches of process 450 simultaneously. According to an exemplary embodiment, process 450 may include three branches. A first branch may be executed by a channel-FC network (or channel-FC layers) 460, which preserves original information (e.g., features) in the plurality of tokens. A second branch and a third branch may be executed by a PATM module 470 and a PATM module 480, respectively. PATM module 470 and PATM module 480 may be utilized to process the plurality of tokens from different perspectives. As an example, the plurality of tokens may be generated from a two-dimensional ("2D") image. The 2D image may be processed to output feature maps (e.g., by applying filters or feature detectors to the input image), which may be defined by H×W×C. H, W, and C are height, width, and the number of channels associated with the 2D image, respectively. The plurality of tokens may carry the information corresponding to the feature maps. As such, PATM module 470 may be dedicated to aggregate spatial information of the plurality of the tokens along the dimension of height H, whereas PATM module 480 may be dedicated to aggregate the spatial information of the plurality of the tokens along the dimension of width W. The results from the channel-FC layers 460, PATM modules 470, and PATM modules 480 may be summed to generate outputs of process 450. In some instances, a set of channel-FC layers 460, PATM module 470, and PATM module 480 may be used for processing one channel associated with the input 2D image.

In some examples, process 450 may further include multiple sets of channel-FC layers 460, PATM modules 470, and PATM modules 480 to process the C number of channels of information associated with the input 2D image. The sets of channel-FC layers 460, PATM modules 470, and PATM modules 480 may be connected in parallel or in series for the data processing.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods/processes described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for data processing using a phase-aware token mixing (PATM) module in a multi-layer perceptrons (MLP) architecture, the method comprising:

determining, in the MLP architecture, a plurality of tokens for data comprising pixels of an image, wherein the MLP architecture includes a sub-network including a plurality of branches to process the plurality of tokens in parallel, wherein a first branch of the plurality of branches is used to aggregate spatial information along height corresponding to the plurality of tokens, wherein a second branch of the plurality of branches is used to aggregate spatial information along width associated with the plurality of tokens, wherein a third branch of the plurality of branches is used to preserve original information in the plurality of tokens, and wherein each token comprises a subset of the pixels describing a patch of the image;

generating, in the MLP architecture, a wave-like token for each of the plurality of tokens, thereby creating a plurality of wave-like tokens, wherein each wave-like token in the plurality of wave-like tokens includes an amplitude and phase;

generating, by the PATM module, optimized tokens by superposing of the plurality of wave-like tokens, so as to aggregate information contained in the amplitudes and the phases of the plurality of wave-like tokens, wherein the aggregate information in each optimized token includes information in its phase and amplitude in addition to information regarding modulation of fixed weights provided by the MLP architecture, and wherein the additional information relates to attributes of the image; and determining, in the MLP architecture, one or more features in the image based on a plurality of optimized tokens.

2. The method according to claim 1, wherein generating the amplitude and the phase for each of the plurality of wave-like tokens further comprises:

extracting information associated with each token for the plurality of tokens; and determining the amplitude and the phase for the wave-like token based on the information associated with each token.

3. The method according to claim 2, wherein the information associated with the token comprises at least one feature of the one or more features included in the data, wherein the amplitude for the wave-like token represents at least one feature in an associated token, and wherein the phase for the wave-like token is related to differences between the token and other tokens in the plurality of tokens.

4. The method according to claim 2, wherein the extraction of the information associated with each token for the plurality of tokens is performed by a number of fully-connected (FC) layers included in the MLP architecture, and wherein the number of FC layers are connected by at least one non-linear activation function.

5. The method according to claim 1, the method further comprising normalizing the plurality of tokens.

6. The method according to claim 1, wherein optimizing the plurality of wave-like tokens by superposing their amplitudes and the phases further comprises determining optimized amplitudes for the optimized tokens based on the phases for the plurality of tokens.

7. The method according to claim 1, wherein the method further comprises generating a plurality of feature maps associated with the plurality of tokens, each token carrying information in the corresponding feature map, wherein each feature map includes spatial information along height, spatial information along width and information of a number of channels associated with the image.

8. The method according to claim 1, the plurality of tokens are processed by a number of iterations by using the MLP.

9. The method according to claim 1, wherein the method further comprises:

identifying one or more objects in the image based on the one or more features included in the data; and classifying the image among a plurality of images based on the one or more objects.

10. The method according to claim 1, wherein the data is one of audio data, video data, graphic data, and contextual data.

11. A device for data processing using a phase-aware token mixing (PATM) module in a multi-layer perceptrons (MLP) architecture, the device comprising:

one or more processors; and a non-transitory computer-readable medium, having computer-executable instructions stored thereon, the computer-executable instructions, when executed by the one or more processors, causing the device to perform:

determining a plurality of tokens for data comprising pixels of an image, wherein the MLP architecture includes a sub-network including a plurality of branches to process the plurality of tokens in parallel, wherein a first branch of the plurality of branches is used to aggregate spatial information along height corresponding to the plurality of tokens, wherein a second branch of the plurality of branches is used to aggregate spatial information along width associated with the plurality of tokens, wherein a third branch of the plurality of branches is used to preserve original information in the plurality of tokens, and wherein each token comprises a subset of the pixels describing a patch of the image;

generating a wave-like token for each of the plurality of tokens, thereby creating a plurality of wave-like tokens, wherein each wave-like token in the plurality of wave-like tokens includes an amplitude and phase;

generating, at the PATM module, optimized tokens by superposing of the plurality of wave-like tokens, so as to aggregate information contained in the amplitudes and the phases of the plurality of wave-like tokens, wherein the aggregate information in each optimized token includes information in its phase and amplitude in addition to information regarding modulation of fixed weights provided by the MLP architecture, and wherein the additional information relates to attributes of the image; and determining one or more features in the image based on a plurality of optimized tokens.

12. The device according to claim 11, wherein generating the amplitude and the phase for each of the plurality of wave-like tokens further comprises:

extracting information associated with each token for the plurality of tokens; and determining the amplitude and the phase for the wave-like token based on the information associated with each token.

13. The device according to claim 12, wherein the information associated with the token comprises at least one feature of the one or more features included in the data, wherein the amplitude for the wave-like token represents at least one feature in an associated token, and wherein the phase for the wave-like token is related to differences between the token and other tokens in the plurality of tokens.

14. The device according to claim 12, wherein the extraction of the information associated with each token for the plurality of tokens is performed by a number of fully-connected (FC) layers included in the MLP architecture, and the number of FC layers are connected by at least one non-linear activation function.

15. The device according to claim 11, wherein optimizing the plurality of wave-like tokens by superposing their amplitudes and the phases further comprises determining optimized amplitudes for the optimized tokens based on the phases for the plurality of tokens.

16. The device according to claim 11, wherein the computer-executable instructions, when executed by one or more processors, cause the one or more processors to further facilitate:

generating a plurality of feature maps corresponding to the plurality of tokens, each token carrying information in the corresponding feature map, wherein each feature map includes spatial information along height, spatial information along width and information of a number of channels associated with the image.

17. The device according to claim 11, wherein the computer-executable instructions, when executed by one or more processors, cause the one or more processors to further facilitate:

identifying one or more objects in the image based on the one or more features included in the data; and classifying the image among a plurality of images based on the one or more objects.

18. A non-transitory computer-readable medium storing computer-executable instructions that, when executed by one or more processors based on a multi-layer perceptrons (MLP) architecture that includes a phase-aware token mixing (PATM) module, cause the one or more processors to perform:

determining a plurality of tokens for data comprising pixels of an image, wherein the MLP architecture includes a sub-network including a plurality of branches to process the plurality of tokens in parallel, wherein a first branch of the plurality of branches is used to aggregate spatial information along height corresponding to the plurality of tokens, wherein a second branch of the plurality of branches is used to aggregate spatial information along width associated with the plurality of tokens, wherein a third branch of the plurality of branches is used to preserve original information in the plurality of tokens, and wherein each token comprises a subset of the pixels describing a patch of the image;

generating a wave-like token for each of the plurality of tokens, thereby creating a plurality of wave-like tokens, wherein each wave-like token in the plurality of wave-like tokens includes an amplitude and phase;

generating, by the PATM module, optimized tokens by superposing of the plurality of wave-like tokens, so as to aggregate information contained in the amplitudes and the phases of the plurality of wave-like tokens, wherein the aggregate information in each optimized token includes information in its phase and amplitude in addition to information regarding modulation of fixed weights provided by the MLP architecture, and wherein the additional information relates to attributes of the image; and determining one or more features in the image based on a plurality of optimized tokens.

19. The non-transitory computer-readable medium according to claim 18, wherein generating the amplitude and the phase for each of the plurality of wave-like tokens further comprises:

extracting information associated with each token for the plurality of tokens; and determining the amplitude and the phase for the wave-like token based on the information associated with each token.

20. The non-transitory computer-readable medium according to claim 18, wherein optimizing the plurality of wave-like tokens by superposing their amplitudes and the phases further comprises determining optimized amplitudes for the optimized tokens based on the phases for the plurality of tokens.

* * * * *